US012644031B2

(12) United States Patent
Herker et al.

(10) Patent No.: US 12,644,031 B2
(45) Date of Patent: Jun. 2, 2026

(54) COMPOSITION

(71) Applicant: KANSAI HELIOS AUSTRIA GMBH, Vienna (AT)

(72) Inventors: Mario Herker, Gumpoldskirchen (AT); Johann Schellenberg, Baden (AT); Karl Rametsteiner, Linz (AT); Christian Breitwieser, Vienna (AT); Gerhard Typpelt, Vienna (AT)

(73) Assignee: KANSAI HELIOS AUSTRIA GMBH, Vienna (AT)

( * ) Notice: Subject to any disclaimer, the term of this patent is extended or adjusted under 35 U.S.C. 154(b) by 408 days.

(21) Appl. No.: 18/272,532

(22) PCT Filed: Jan. 14, 2022

(86) PCT No.: PCT/EP2022/050753
§ 371 (c)(1),
(2) Date: Jul. 14, 2023

(87) PCT Pub. No.: WO2022/152851
PCT Pub. Date: Jul. 21, 2022

(65) Prior Publication Data
US 2024/0067851 A1 Feb. 29, 2024

(30) Foreign Application Priority Data
Jan. 15, 2021 (EP) .................................... 21151780

(51) Int. Cl.
| | |
|---|---|
| *B29C 65/48* | (2006.01) |
| *B32B 15/01* | (2006.01) |
| *B32B 37/12* | (2006.01) |
| *C08G 59/24* | (2006.01) |
| *C08G 59/38* | (2006.01) |
| *C08G 59/40* | (2006.01) |
| *C09D 163/00* | (2006.01) |
| *C09J 7/35* | (2018.01) |
| *C09J 163/00* | (2006.01) |
| *C09J 163/04* | (2006.01) |
| *H01F 1/18* | (2006.01) |
| *H01F 3/02* | (2006.01) |
| *H01F 27/245* | (2006.01) |
| *H01F 41/02* | (2006.01) |

(52) U.S. Cl.
CPC ......... *C09J 163/04* (2013.01); *B29C 65/4835* (2013.01); *B32B 15/01* (2013.01); *B32B 15/011* (2013.01); *C08G 59/245* (2013.01); *C08G 59/38* (2013.01); *C08G 59/4021* (2013.01); *C08G 59/4028* (2013.01); *C09D 163/00* (2013.01); *C09J 7/35* (2018.01); *C09J 163/00* (2013.01); *H01F 1/18* (2013.01); *H01F 3/02* (2013.01); *H01F 27/245* (2013.01); *H01F 41/0233* (2013.01); *B32B 2037/1253* (2013.01); *B32B 2307/208*

(2013.01); *B32B 2363/00* (2013.01); *C08G 2150/00* (2013.01); *C08G 2170/00* (2013.01); *C09J 2301/304* (2020.08); *C09J 2400/163* (2013.01); *C09J 2463/00* (2013.01)

(58) Field of Classification Search
CPC ..... B29C 65/4835; B32B 15/00; B32B 15/01; B32B 15/011; B32B 15/18; B32B 37/1207; B32B 2037/1215; B32B 2037/1253; B32B 2307/208; B32B 2311/00; B32B 2311/30; B32B 2363/00; C08G 59/245; C08G 59/38; C08G 59/4021; C08G 59/4028; C08G 59/686; C08G 2170/00; C08G 2170/20; C08G 2170/80; C08L 63/00; C08L 63/04; C09D 163/00; C09D 163/04; C09J 5/06; C09J 7/35; C09J 163/00; C09J 163/04; C09J 2301/304; C09J 2400/163; C09J 2463/00; H01F 1/18; H01F 3/02; H01F 27/245; H01F 41/0233
See application file for complete search history.

(56) References Cited

U.S. PATENT DOCUMENTS

| | | | |
|---|---|---|---|
| 2007/0087201 A1* | 4/2007 | Wimmer | C08G 59/621 |
| | | | 525/481 |
| 2009/0264558 A1 | 10/2009 | Kramer | |
| 2023/0183518 A1* | 6/2023 | Takeda | C09D 7/66 |

FOREIGN PATENT DOCUMENTS

| | | | | |
|---|---|---|---|---|
| EP | 3460019 | | 3/2019 | |
| JP | 2000344861 | | 12/2000 | |
| WO | WO-2018236454 A1 * | 12/2018 | ............ | C09J 163/04 |
| WO | WO-2021256535 A1 * | 12/2021 | ........... | C09D 163/00 |

OTHER PUBLICATIONS

International Preliminary Report for International Application No. PCT/EP2022/050753, mailed Dec. 21, 2022, 6 pages.

* cited by examiner

*Primary Examiner* — Michael A Tolin
(74) *Attorney, Agent, or Firm* — Workman Nydegger

(57) ABSTRACT

The present invention relates to a composition, preferably for bonding together metal sheets, comprising:
- a. 1 part by mole of at least one linear epoxy resin with an average epoxy equivalent weight of 600 to 5,000 g/mole and an epoxy functionality of 2,
- b. 0.4 to 0.8 parts by mole of at least one non-linear epoxy resin having an average epoxy equivalent weight of 180 to 350 g/mole and an average epoxy functionality of at least 3,
- c. 0.8 to 1.3 parts by mole of at least one basic hardener comprising at least two free amine-bonded hydrogen atoms, and
- d. 0.9 to 1.2 parts by mole of at least one crosslinker comprising at least two blocked isocyanate groups.

23 Claims, No Drawings

COMPOSITION

TECHNICAL FIELD

The present invention relates to compositions which are suitable in particular for bonding together sheet metals.

BACKGROUND OF THE INVENTION

Metal parts that are bonded together, such as sheet metal parts, are applied in a wide variety of technical fields. Especially in the construction of generators, electric motors, transformers and other electrical machines, stacks of electrical sheet metal parts bonded together are used as a starting material for magnetic cores. Sheet metal parts to be bonded together are usually provided with a special adhesive layer on one or both sides, preferably with a crosslinkable hot-melt adhesive, a so-called "bonding varnish". Coatings made of bonding varnish have the advantage that they do not develop any adhesive effect after having been applied to the surface of a metal, in particular a sheet metal (e.g., a sheet metal strip).

The adhesive layer is activated only in the course of a bonding process, for example by thermal energy being supplied. The coating becomes adhesive as a result of this activation so that metals abutting each other can be bonded together. At the same time, the adhesive layer is cured and becomes a heat-resistant thermosetting plastic.

The production of sheet metal parts or, respectively, sheet metal lamellas that are bonded together with bonding varnish has the following advantages, among others:
- a) maintaining the magnetic properties by preserving the microstructure in the steel structure by applying moderate joining temperatures and pressures;
- b) compact packs of laminations with tight manufacturing tolerances improve the dissipation of waste heat produced during operation. Cooling assemblies can thus be minimized;
- c) the viscoelastic connecting layers between the individual lamellas exhibit a pronounced damping behaviour in relation to the transmission of sound;
- d) thin, stable adhesive layers, without leakage of adhesive at the outer edges, allow a high degree of design freedom while using the narrowest possible tolerances;
- e) avoiding corrosion problems (interlamellar corrosion) through a highly stable, heat-resistant, hydrolysis-resistant full-surface connection; and
- f) a good insulation effect against electric short circuits, as a result of which the efficiency of transformers, for example, can be increased.

Crosslinkable hot-melt adhesives have been adequately described in the prior art. In WO 2006/049935, for example, an adhesive composition is disclosed which comprises an epoxy resin, pyrogenic silicon dioxide particles and a selection of curing agents such as phenolic resins, carboxylic acids, anhydrides, isocyanates and, above all, dicyandiamide, which is used as the sole hardener in all examples of use. This self-adhesive coating is applied to electrical sheets and dried at a temperature of between 230° C. and 260° C. Lamellas punched out of the coated electrical sheet are placed one on top of the other and are bonded together over a period of 60 to 120 minutes at a temperature of between 100° C. and 300° C. and at an increased pressure.

Adhesive compositions as described in WO 2006/049935, which essentially comprise bisphenol-A or bisphenol-F epoxy resins and mixtures thereof (but without any indication as to equivalent weights, functionalities and the like), pyrogenic silicon dioxide as a filler and reinforcing agent and a hardener such as, e.g., a Lewis acid, are problematic to handle, since Lewis acids in particular are, for the most part, very harmful to health and toxic.

Thermally activatable adhesive compositions which comprise an epoxy resin, an activatable hardener and an activatable accelerator are also described in WO 2017/050892. These adhesive compositions are cured on the surface of sheet metals at a temperature of above 100° C. Subsequently, sheet metal lamellas are punched out, stacked one on top of the other and bonded together by activating the adhesive located on the surfaces at a temperature of approx. 200° C. The activation time of such adhesives is 0.5 to 1 second, and the maximum curing time is 5 seconds.

The rapid curing of the adhesive layer, namely the catalytically accelerated reaction of dicyandiamide as a hardener with epoxy resin, is achieved in WO 2017/050892 by adding specific accelerators, in particular by adding Lewis acids, which usually are harmful to health and toxic, with non-specific and rapid chemical reactions leading to very high crosslink densities, resulting in brittleness and reduced durability of the adhesive layer. In addition, there is a risk of premature partial crosslinking in the liquid delivery state, which becomes noticeable as a strong increase in viscosity and poor shelf life.

In WO 2020/233840, it is taught in particular that a temperature control of the lamellas which have been punched out and thus have already been coated is necessary in order to minimize electrical losses in the finished product (of a machine comprising packs of laminations bonded together). Because of such an additional energy-intensive process step, processes for the production of laminated cores become inefficient.

All three publications discussed herein have in common that the curing of, basically, dicyandiamide with epoxy resin is to be shortened by so-called catalytic accelerators. The problems associated therewith such as a precise temperature control, crosslinking times that are overly short and hardly controllable during production, over-crosslinking and the embrittlement associated therewith as well as the toxicity of accelerators are accepted.

It is an object of the present invention to provide a water-dilutable composition which allows metal parts such as sheet metals to be bonded together in the shortest possible time. By reducing the time required for the bonding process, significant cost savings are possible. In addition, the composition should not have the disadvantages of the prior art, in particular of WO 2006/049935, WO 2017/050892 and WO 2020/233840.

It is another object of the present invention to provide a composition that is storage-stable over a period of at least six months. The metals coated with such a composition should also be bondable without limitation even after storage for more than six months.

SUMMARY OF THE INVENTION

The present invention relates to a composition, preferably for bonding together metal sheets, comprising:
- a. 1 part by mole of at least one linear epoxy resin with an average epoxy equivalent weight of 600 to 5,000 g/mole and an epoxy functionality of 2,
- b. 0.4 to 0.8 parts by mole of at least one non-linear epoxy resin having an average epoxy equivalent weight of 180 to 350 g/mole and an average epoxy functionality of at least 3, c. 0.8 to 1.3 parts by mole of at least one basic hardener comprising at least two free amine-bonded hydrogen atoms, and d. 0.9 to 1.2 parts by mole of at least one (pre)crosslinker comprising at least two blocked isocyanate groups.

The composition according to the invention can be used as a one-component material for the coating and subsequent bonding of metals, in particular sheet metals, sheet metal parts or, respectively, sheet metal lamellas. Surprisingly, it has been shown that the composition according to the invention exhibits high storage stability, preferably at room temperature, so that the composition can be used for the coating and subsequent bonding of metals, in particular sheet metals, without loss of quality even after several months, i.e., at least six, preferably at least eight, more preferably at least twelve, months.

If a metal, in particular a sheet metal or, respectively, a sheet metal part, is coated with the composition according to the invention, it can be bonded with a second metal, which optionally has been coated, even after a period of at least six months. As a result, it is possible to store coated metals over a longer period of time and to process and bond them if necessary.

The composition according to the invention has the advantage that it can be dried and simultaneously pre-crosslinked (in under two minutes) on the surface of a metal quickly and using temperatures that are lower than those of comparable compositions of the prior art. In this way, coating processes can be optimized and shortened. In particular, the coating of sheet metals, which are usually stored in a rolled-up state, is thereby significantly simplified and optimized since the sheet metals can be rolled up again in a very short time after they have been coated, usually immediately after the rolling and coating process.

Another advantage of the present invention is that an additional temperature control of the coated, punched and optionally layered sheet metals prior to final bonding and curing is no longer necessary, although this is frequent practice in accordance with the prior art (see, e.g., WO 2020/233840), since the curing parameters can be set so precisely that wide application windows (time and temperature gradients) can be omitted. This leads to additional energy savings and an increase in efficiency when the composition according to the invention is used.

The "activation and final curing" of the pre-crosslinked coating on the metal and the subsequent bonding with another metal can also take place in a shorter time (in less than two minutes), in comparison with other compositions of the prior art.

The composition according to the invention is particularly advantageous since Lewis acids harmful to health—as suggested in the literature—can be dispensed with, for example, for crosslinking the components. In addition, the composition according to the invention can be provided essentially on a water basis, as a result of which the use of organic solvents can largely be dispensed with. The use of water as a basis of the compositions has, on the one hand, safety-related advantages and, on the other hand, also advantages in terms of health, since, for example, vapours/waste gases from organic solvents can be prevented and/or minimized.

By providing a basic hardener and a crosslinker in the composition according to the invention, it is possible to control both the (pre)crosslinking and the final curing of the resins and their binding to a metallic surface more advantageously than ever before with adhesive compositions as described in the prior art.

The crosslinking of the resins with the composition according to the invention thus occurs in two chemically different and easily controllable sub-steps.

In a first sub-step, a pre-crosslinking of the composition applied to a metallic surface occurs at the temperatures and times adapted to production via a reaction of secondary hydroxyl groups from the linear, difunctional (epoxy functionality of 2) and preferably long-chain epoxy resins with multifunctional, preferably di- or trifunctional, isocyanates to form a wide-meshed, elastic polyurethane matrix. In this first step, the epoxy groups are preserved for the time being. The isocyanates present in the composition according to the invention exist in the delivery form in an amine-blocked form and are unblocked and enabled for polyaddition only by a moderate influence of temperature. Surprisingly, the amines concurrently emerging in the process do not escape into the environment, but are added to the oxirane groups of the epoxy resins to form tertiary amines. These in turn accelerate the formation of polyurethane (addition of the isocyanates to the hydroxyl groups) so that this first sub-step of crosslinking takes place very quickly and completely, with the obtained adhesive layer being preserved in a still thermoplastic state and thus being perfectly suitable as a hot-melt adhesive for a second sub-step.

By selecting the isocyanates, their spacer length, the blocking amines and the optimum crosslinking parameters, the desired properties can be set in a reproducible manner by a person skilled in the art. Surprisingly, it has also been shown that 0.2 to 1.0, preferably 0.3 to 0.8, more preferably 0.3 to 0.6, NCO equivalents (i.e., isocyanate equivalents) per OH equivalent yield a particularly suitable pre-crosslinking.

In order to achieve a duroplastic and thus heat-resistant full crosslinking in a second sub-step, a further addition reaction of at least one basic hardener with at least two amine-bonded hydrogen atoms per molecule and plentiful thermally reactive epoxy groups in the composition is necessary. It has been shown what can be achieved by amine hardeners based on guanidines, for example, and the use of preferably hydroxyl group-free, at least trifunctional, non-linear epoxy resins, such as novolak epoxy resins (i.e., epoxy resins with an average epoxy functionality of at least 3).

The average functionality of the epoxy resin mixture (i.e., the number of epoxy groups per resin molecule) in the composition according to the invention preferably ranges from 2.3 to 5.0, more preferably from 2.4 to 3.5. With such functionality, the best results in terms of heat resistance, adhesion and peel strength can be achieved.

In addition, it has been shown that the ratio of oxirane to NH groups in the composition according to the invention should preferably be in the range from 0.8 to 1.3, more preferably from 0.9 to 1.1.

In summary, NCO and oxirane groups thus react, albeit in the graded sequence of the above-mentioned crosslinking steps, in each case by addition reactions with OH and NH groups to form a duroplastic, sufficiently elastic material for connecting electrical sheets.

A further aspect of the present invention relates to a coated metal, preferably a coated sheet metal, which can be produced by applying a composition according to the invention to a solid body, preferably a sheet metal.

Yet another aspect of the present invention relates to a method of coating and optionally bonding together sheet metals, comprising the steps of applying a composition according to the invention to the surface of a sheet metal, drying and simultaneously pre-crosslinking the composition on the surface of the sheet metal at a temperature of 150 to 200° C., preferably 170-190° C., for a period of 10 seconds to 2 minutes, preferably 20 to 30 seconds, optionally punching sheet metal pieces out of the sheet metal, optionally stacking the sheet metal parts that have been punched out, and optionally bonding together and hardening the punched-out sheet metal parts at a temperature of 220 to 260° C. for a period of 5 seconds to 2 minutes, preferably 10 to 30 seconds.

Another aspect of the present invention relates to a laminated core or a component part comprising a laminated core, in particular a component part for electrical machines and/or transformers, the laminated core comprising at least two sheet metals bonded together with a composition according to the invention.

DESCRIPTION OF THE EMBODIMENTS

The composition of the invention is produced by mixing
a. 1 part by mole of at least one linear epoxy resin with an average epoxy equivalent weight of 600 to 5,000 g/mole and an epoxy functionality of 2,
b. 0.4 to 0.8 parts by mole of at least one non-linear epoxy resin with an average epoxy equivalent weight of 180 to 350 g/mole and an average epoxy functionality of at least 3,
c. 0.8 to 1.3 parts by mole of at least one basic hardener comprising at least two free amine-bonded hydrogen atoms, and
d. 0.9 to 1.2 parts by mole of at least one crosslinker comprising at least two blocked isocyanate groups.

"Part by mole" as used herein represents the mutual molar ratio of the components present in the composition. For example, the composition according to the invention comprises 0.4 to 0.8 parts by mole of the at least one non-linear epoxy resin per part by mole of the at least one linear epoxy resin.

According to a preferred embodiment of the present invention, the composition comprises water and/or an organic solvent and is provided as a solution, emulsion or dispersion.

The composition according to the invention can preferably comprise water and/or an organic solvent, which, for example, originate from the starting components which are dissolved or suspended in water or an organic solvent. In addition, water and/or an organic solvent can be added to adjust the viscosity of the composition according to the invention.

According to a further preferred embodiment of the present invention, the at least one linear epoxy resin has an average epoxy equivalent weight of 1,500 to 2,500 g/mole.

It has been shown that linear epoxy resins based on bisphenols, so-called bisphenol (di) glycidyl ethers, have particularly advantageous properties. Accordingly, the at least one linear epoxy resin is preferably a bisphenol epoxy resin, preferably a bisphenol-A epoxy resin, a bisphenol-F epoxy resin, a bisphenol-S epoxy resin or a bisphenol-Z epoxy resin, with resins based on bisphenol A being particularly preferred.

According to a preferred embodiment of the present invention, the at least one linear epoxy resin comprises at least three bisphenol units per molecule.

According to a further preferred embodiment of the present invention, the at least one linear epoxy resin is a bisphenol-A epoxy resin having 3 to 15, preferably 4, 7 or 9, bisphenol-A units per molecule.

The free hydroxyl groups in the linear epoxy resin are essential for the (pre-)crosslinking of the resins. For this reason, the at least one linear epoxy resin preferably comprises hydroxyl groups, with a linear epoxy resin molecule having at least one, preferably at least two, hydroxyl groups.

According to yet another preferred embodiment of the present invention, the at least one linear epoxy resin comprises two to 14, preferably three, six or eight, secondary hydroxyl groups per molecule.

According to a preferred embodiment of the present invention, the at least one linear epoxy resin comprises a bisphenol-A epoxy resin having 2 to 14, preferably 3, 6 or 8, hydroxyl groups per molecule.

According to a particularly preferred embodiment of the present invention, the at least one non-linear epoxy resin has an average epoxy equivalent weight of 190 to 280 g/mole.

Preferably, the at least one non-linear epoxy resin is at least one novolak epoxy resin.

Novolaks are phenolic resins with a formaldehyde/phenol ratio of less than 1:1, which are obtained by acidic condensation of the educts. Novolaks are particularly useful in the composition of the present invention as they have low oxirane equivalent weights and high functionality and are thus particularly suitable for controlled curing. Due to the absence of hydroxyl groups, they intervene in the processing cascade only in the final curing process (i.e., during bonding).

According to a preferred embodiment of the present invention, the at least one novolak epoxy resin comprises phenol and/or cresol units, the at least one novolak epoxy resin comprising three to eight, preferably three to six, epoxy groups per molecule of epoxy resin.

According to yet another preferred embodiment of the present invention, the mixture of the at least one linear epoxy resin and the at least one non-linear epoxy resin jointly comprises, on average, 2.3 to 5.0, preferably 2.4 to 3.5, epoxy groups per molecule of epoxy resin.

According to a preferred embodiment of the present invention, the at least one basic hardener comprising at least two free amine-bonded hydrogen atoms is a guanidine derivative, preferably selected from the group consisting of dicyandiamide, dicyandiamidine, aminoguanidine, creatine, creatinine, arginine, aliphatic biguanide, aromatic biguanide, 2-aminopyridimine, 3-amino-1,2,4-triazole, 5-amino-1H-tetrazole, 1,3-di-o-tolylguanidine and 2-cyanimino-1H, 5-alkyl-1,3,5-triazine.

As previously indicated, the ratio of oxirane to NH groups in the composition according to the invention is preferably in the range from 0.8 to 1.3, more preferably from 0.9 to 1.1. If some of the guanidine derivatives listed herein have more than two free amine-bonded hydrogen atoms, which usually are reactive in different ways, only the minimum value of two is, in each case, taken into account in the calculations and correlations relevant to the invention.

In order to facilitate additional cross-connections in the pre-crosslinked polyurethane matrix in the course of final curing, a basic hardener containing free amino groups is added to the composition according to the invention. The basic hardener is therefore responsible for the composition according to the invention solidifying in the course of bonding to form a high-strength, thermostable duromer.

According to a further preferred embodiment of the present invention, the at least one (pre-)crosslinker is an aliphatic or cycloaliphatic diisocyanate or triisocyanate, the isocyanate groups of the aliphatic or cycloaliphatic diisocyanate or triisocyanate being separated by a $C_4$ to $C_{10}$ alkyl radical as a spacer.

According to a preferred embodiment of the present invention, the at least one crosslinker comprising at least two isocyanate groups is a diisocyanate, preferably selected from the group consisting of hexamethylene diisocyanate, 2-methyl-hexamethylene diisocyanate, 2,2,4(2,4,4)-trimethyl-hexamethylene diisocyanate (TMDI), 1,12-dodecane diisocyanate, omega,omega-diisocyanatodipropyl ether, 1,4-cyclohexane diisocyanate, 1,4-diisocyanatomethylcyclohexane, isophorone diisocyanate and/or isocyanurate trimers thereof.

According to a particularly preferred embodiment of the present invention, the at least one crosslinker comprising at least two isocyanate groups is hexamethylene diisocyanate, isophorone diisocyanate and/or isocyanurate trimers thereof.

According to a further preferred embodiment of the present invention, the isocyanate groups are blocked with an amine, preferably with a heterocyclic amine comprising at least two nitrogen heteroatoms.

The (pre-)crosslinker added in the composition according to the invention is blocked in order to enable a water-based formulation and, associated therewith, the long shelf life of the composition, since free isocyanates can only exist in anhydrous systems due to their reactivity. In a water-based composition, free isocyanates would lead to a reaction (pre-crosslinking) with the hydroxyl groups of the linear epoxy resins, which is undesirable at this point in time, i.e., already in the delivery form. A solution would thus be a not very practical 2-component solution, additionally with short pot lives upon mixing. The end results would certainly be comparable with those according to the invention, but the purpose of the present invention is to provide a storable 1-component formulation on an aqueous basis. In the course of the coating process wherein the metal is heated with the coating, the blocking groups are removed in order to enable cross-linking of the linear epoxy resins to form a matrix which is still thermoplastic.

According to a preferred embodiment of the present invention, the amine is a pyrazole, an imidazole, a benzimidazole, a 1,2,3-triazole, preferably a benzotriazole, a 1,2,4-triazole, a triazabicyclodecene or an N-monosubstituted piperazine.

According to another preferred embodiment of the present invention, the amine is a pyrazole, preferably 3,4-dimethylpyrazole or 3,5-dimethylpyrazole.

According to a preferred embodiment of the present invention, the at least one organic solvent is a water-miscible solvent and is selected from the group consisting of a $C_3$-$C_6$ ketone, a $C_2$-$C_4$ alcohol, a monoalkyl-($C_2$-$C_4$)-ether of $C_1$-$C_4$ glycols, a di- and/or triethylene and/or -propylene glycol, dioxane, tetrahydrofuran and $C_4$ to $C_8$ lactone.

A further aspect of the present invention relates to a coated metal which can be produced by applying a composition according to the invention to a solid body, preferably a sheet metal.

The composition according to the invention can be applied to a metallic surface using known methods (e.g., by dipping, spraying, rolling, doctoring or spreading). After the composition has been applied, the coating is pre-crosslinked by heating. Subsequently, the metal can be stored for further processing and/or transported.

Yet another aspect of the present invention relates to a method of coating and optionally bonding together sheet metals, comprising the steps of applying a composition according to the invention to the surface of a sheet metal, drying the composition on the surface of the sheet metal and simultaneous pre-crosslinking at a temperature of 150 to 200° C., preferably 170 to 190° C., for a period of 10 seconds to 2 minutes, preferably 20 to 30 seconds, optionally punching sheet metal pieces out of the sheet metal, optionally bonding together the punched-out sheet metal parts at a temperature of 220 to 260° C. for a period of 5 seconds to 2 minutes, preferably 10 to 30 seconds.

It has surprisingly been shown that the composition according to the invention can be cured and bonded together in a particularly short, but technically controllable and adjustable time. In addition, the temperatures used for this are lower than with compositions known from the prior art. As a result, it is possible to design and accelerate industrial processes in a more cost-effective way.

Another aspect of the present invention relates to a laminated core or a component part comprising a laminated core, in particular a component part for electrical machines and/or transformers, the laminated core comprising at least two sheet metals bonded together with a composition according to the invention.

With the method according to the invention and, respectively, with the composition according to the invention, laminated cores can be produced in a simple and quick manner. Laminated cores are applied in a wide variety of areas, with the use in generators, transformers and electric motors being the most important fields of application.

Another aspect of the present invention relates to a laminated core or a component part comprising a laminated core, in particular a component part for electrical machines and/or transformers, obtainable with a method according to the invention.

EXAMPLES

Example 1: Water-Based Composition I

The following components were mixed with water to form a dispersion having a total solids content of 53%:

1 mole of a linear epoxy resin (based on bisphenol A) with an epoxy functionality of 2 and an average epoxy equivalent weight of 1,750 g/mole, provided as a 53% dispersion in water/methoxypropanol (3:1), 0.8 moles of a non-linear epoxy resin (based on phenol novolak) with an epoxy functionality of 3.6 and an average equivalent weight of 194 g/mole, provided as a 58% dispersion in water, 1.1 moles of dicyandiamide (DCDA) calculated with a functionality of 2 and an equivalent weight of 42 g/mole, provided as a 30% solution in methoxypropanol, and 1.12 moles of a hexamethylene diisocyanate (HMDI) blocked with 3,5-dimethylpyrazole (DMP) and having the functionality of 2, provided as a 38% solution in water.

After mixing, the dispersion was heated to 60° C. for 15 min and then cooled to room temperature. The viscosity of the dispersion was 60 to 80 s (flow time according to DIN EN ISO 2431:2011).

Composition I showed the following parameters according to the invention:

| | |
|---|---|
| Σ Equiv. —OH: | 6 |
| Σ Equiv. —NH: | 4.45 |
| Σ Equiv. —NCO: | 2.25 |
| Σ equiv. – oxirane: | 4.9 |
| Σ OH + NH: | 10.45 |
| Σ NCO + oxirane: | 7.15 |

Composition I exhibited an average epoxy functionality of the linear and non-linear epoxy resins of 2.71. The ratios of NCO to OH groups were 0.37, the ratios of oxirane to NH groups were 1.10, and the ratios of NCO and oxirane groups to OH and NH groups were 0.68.

Composition I could be stored at room temperature for more than 6 months without affecting the beneficial properties. During this period, there was no visible separation of the components.

It was found that Composition I can be dried and pre-crosslinked at 195° C. in 20 seconds after application to a sheet metal. Two sheet metals, one of them coated with Composition I, could be bonded together at 210° C. in 15 seconds.

In order to rule out that this was not a pure catalysis of an amine (DMP) as the reaction accelerator DCDA/OXIRAN, instead of the capped (blocked) amine, the equimolar amount of DMP was used in an additional experiment. After its application to a sheet metal, this composition was so reactive that an almost complete cross-linking of the reactive groups of the composition occurred on the metal surface in a very short time. As a result of this quick cross-linking, the applied composition received duroplastic properties and could no longer be bonded together thermally.

In order to substantiate the necessity of the required NCO specification according to the invention, the simplest prototype of a blocked isocyanate, namely urea, was used instead of the HMDI compound. This reference composition solidified within 14 hours at room temperature and was no longer amenable for further processing and was thus not storable.

In further comparative tests, it became apparent that common crosslinking agents as substitutes for DCDA, such as hexamethylene tetramine or hexamethylolmelamine, also led to significantly reduced service lives of the batches and hardened after a few hours.

Example 2: Composition II Solvent-Based Comparison

Composition II differed from Composition I (see Example 1) in that the linear epoxy resin is added as a 75% solution in methyl ethyl ketone (MEK) and the non-linear epoxy resin is added as a liquid resin. In addition, the blocked hexamethylene diisocyanate is added as a 50% solution in MEK/MP (methoxypropanol) (1:1). The total solids content is adjusted to 40% with MP.

After mixing, the composition was heated to 60° C. for 15 min and then cooled to room temperature. The viscosity of the dispersion was 60 s (flow time according to DIN EN ISO 2431:2011).

Parameters and relations were analogous to example 1.

When the composition was stored at room temperature, the onset of gelation was noticed after 10 weeks.

Shelf life: 10 weeks, then onset of gelation.

However, it was found that Composition II, which is solvent-based, can also be pre-crosslinked at 195° C. in 20 seconds after application to a sheet metal. Two sheet metals, one of them coated with Composition II, could be bonded together at 215° C. in 12 seconds.

Example 3: Water-Based Composition III

Composition III comprised, analogously to Composition I, 1 mole of the linear epoxy resin. In addition, Composition III contained 0.6 moles of a cresol-based novolak resin having an epoxy functionality of 5.5 and an average equivalent weight of 215 g/mole, provided as a 40% dispersion in water. As a hardener, Composition III contained 1.1 moles of creatinine having a functionality of 2 and an equivalent weight of 56.5 g/mole, provided as a 30% solution in methoxypropanol. Composition III additionally contained 1 mole of a trimeric HMDI blocked with DMP and having a functionality of 3, provided as a 40% solution in water.

After mixing, Composition III was heated to 60° C. for 15 min and then cooled to room temperature. The viscosity of the dispersion was 60 to 80 s (flow time according to DIN EN ISO 2431:2011).

Composition III showed the following parameters according to the invention:

| | |
|---|---|
| Σ Equivalents —OH: | 6 |
| Σ Equivalents —NH: | 5 |
| Σ Equivalents —NCO: | 3 |
| Σ Equivalents oxirane: | 5.3 |
| Σ OH + NH: | 11 |
| Σ NCO + oxirane: | 8.3 |

Composition III exhibited an average epoxy functionality of the functionalities of the linear and non-linear epoxy resins of 2.97. The ratio of NCO to OH groups was 0.5, the ratio of oxirane to NH groups was 1.06, and the ratio of NCO and oxirane groups to OH and NH groups was 0.75.

It was found that Composition III can be dried at 180° C. to 195° C. in 20 to 30 seconds after application to a sheet metal. Two sheet metals, one of them coated with Composition III, could be bonded together at 230° C. in 25 seconds.

After one month of storage at room temperature, Composition III showed a slight increase in viscosity, and the composition began to gel after another two months. However, the resulting thixotropic properties remained acceptable for another three months.

The invention claimed is:

1. A composition for bonding together metal sheets, comprising:
   a. 1 part by mole of at least one linear epoxy resin with an average epoxy equivalent weight of 600 to 5,000 g/mole and an epoxy functionality of 2,
   b. 0.4 to 0.8 parts by mole of at least one non-linear epoxy resin having an average epoxy equivalent weight of 180 to 350 g/mole and an average epoxy functionality of at least 3,
   c. 0.8 to 1.3 parts by mole of at least one basic hardener comprising at least two free amine-bonded hydrogen atoms, and
   d. 0.9 to 1.2 parts by mole of at least one crosslinker comprising at least two blocked isocyanate groups.

2. The composition according to claim 1, wherein the composition comprises water and/or an organic solvent and is provided as a solution, emulsion, or dispersion.

3. The composition according to claim 2, wherein the at least one organic solvent is a water-miscible solvent and is selected from the group consisting of a $C_3$-$C_6$ ketone, a $C_2$-$C_4$ alcohol, a monoalkyl-($C_2$-$C_4$)-ether of $C_1$-$C_4$ glycols, a di- and/or triethylene and/or-propylene glycol, dioxane, tetrahydrofuran and $C_4$ to $C_8$ lactone.

4. The composition according to claim 1, wherein the at least one linear epoxy resin has an average epoxy equivalent weight of 1,500 to 2,500 g/mole.

5. The composition according to claim 1, wherein the at least one linear epoxy resin is a bisphenol epoxy resin.

6. The composition according to claim 5, wherein the bisphenol epoxy resin is a bisphenol-A epoxy resin, a bisphenol-F epoxy resin, a bisphenol-S epoxy resin or a bisphenol-Z epoxy resin.

7. The composition according to claim 5, wherein the linear epoxy resin comprises at least three bisphenol units per molecule.

8. The composition according to claim 1, wherein the at least one linear epoxy resin is a bisphenol-A epoxy resin having 3 to 15 bisphenol-A units per molecule.

9. The composition according to claim 1, wherein the at least one linear epoxy resin comprises two to 14 secondary hydroxyl groups per molecule.

10. The composition according to claim 1, wherein the at least one non-linear epoxy resin has an average epoxy equivalent weight of 190 to 280 g/mole.

11. The composition according to claim 1, wherein the at least one non-linear epoxy resin is at least one novolak epoxy resin.

12. The composition according to claim 11, wherein the at least one novolak epoxy resin comprises phenol and/or cresol units, the at least one novolak epoxy resin comprising three to eight epoxy groups per molecule of epoxy resin.

13. The composition according to claim 1, wherein the at least one linear epoxy resin and the at least one non-linear epoxy resin jointly comprise, on average, 2.3 to 5.0 epoxy groups per molecule of epoxy resin.

14. The composition according to claim 1, wherein the at least one basic hardener comprising at least two free amine-bonded hydrogen atoms is a guanidine derivative.

15. The composition according to claim 14, wherein the guanidine derivative is selected from the group consisting of dicyandiamide, dicyandiamidine, aminoguanidine, creatine, creatinine, arginine, aliphatic biguanide, aromatic biguanide, 2-aminopyridimine, 3-amino-1,2,4-triazole, 5-amino-1H-tetrazole, 1,3-di-o-tolylguanidine, and 2-cyanimino-1H, 5-alkyl-1,3,5-triazine.

16. The composition according to claim 1, wherein the at least one crosslinker is an aliphatic or cycloaliphatic diisocyanate or triisocyanate, the isocyanate groups of the aliphatic or cycloaliphatic diisocyanate or triisocyanate being separated by a $C_4$ to $C_{10}$ alkyl radical.

17. The composition according to claim 16, wherein the at least one crosslinker is selected from the group consisting of hexamethylene diisocyanate, 2-methyl-hexamethylene diisocyanate, 2,2,4 (2,4,4)-trimethyl-hexamethylene diisocyanate (TMDI), 1,12-dodecane diisocyanate, omega, omega-diisocyanatodipropyl ether, 1,4-cyclohexane diisocyanate, 1,4-diisocyanatomethylcyclohexane, and isophorone diisocyanate, and isocyanurate trimers thereof.

18. The composition according to claim 1, wherein the isocyanate groups are blocked with an amine.

19. The composition according to claim 18, wherein the amine which blocks the isocyanate groups is selected from the group consisting of a heterocyclic amine comprising at least two nitrogen heteroatoms, a pyrazole, 3,4-dimethylpyrazole, 3,5-dimethylpyrazole, an imidazole, a benzimidazole, a 1,2,3-triazole, a benzotriazole, a 1,2,4-triazole, a triazabicyclodecene, and an N-monosubstituted piperazine.

20. A coated metal made by applying the composition according to claim 1 to a solid body.

21. A laminated core or a component part comprising the laminated core, the laminated core comprising at least two sheet metals bonded together with a composition according to claim 1.

22. A method of coating and optionally bonding together sheet metals, comprising the steps of applying the composition according to claim 1 to a surface of a sheet metal, drying and pre-crosslinking the composition on the surface of the sheet metal at a temperature of 150 to 200° C. for a period of 10 seconds to 2 minutes, optionally punching sheet metal pieces out of the sheet metal, optionally stacking the sheet metal pieces that have been punched out, and optionally bonding together and hardening the punched-out sheet metal pieces at a temperature of 220 to 260° C. for a period of 5 seconds to 2 minutes.

23. A laminated core or a component part comprising the laminated core that is a component part for electrical machines and/or transformers, made by a method according to claim 22.

\* \* \* \* \*